US012720487B2

(12) United States Patent
Dallal et al.

(10) Patent No.: US 12,720,487 B2
(45) Date of Patent: Aug. 25, 2026

(54) PAGING MESSAGES FOR FORWARDING BY A NETWORK NODE

(71) Applicant: QUALCOMM Incorporated, San Diego, CA (US)

(72) Inventors: Yehonatan Dallal, Kfar Saba (IL); Amit Bar-Or Tillinger, Tel-Aviv (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 17/934,162

(22) Filed: Sep. 21, 2022

(65) Prior Publication Data

US 2024/0107499 A1 Mar. 28, 2024

(51) Int. Cl.
*H04W 68/02* (2009.01)

(52) U.S. Cl.
CPC .................................. *H04W 68/02* (2013.01)

(58) Field of Classification Search
CPC .................................................... H04W 68/02
USPC ........................................................ 455/458
See application file for complete search history.

(56) References Cited

U.S. PATENT DOCUMENTS 10,701,667 B2 6/2020 Abedini et al.
2016/0366664 A1 12/2016 Diachina et al.
2017/0099649 A1* 4/2017 Vos ....................... H04W 76/28
2018/0026698 A1* 1/2018 Lee ........................ H04B 7/043 370/335
2018/0220288 A1* 8/2018 Agiwal .................. H04W 8/24
2020/0015191 A1 1/2020 Lee et al.

FOREIGN PATENT DOCUMENTS

EP 3592058 A1 1/2020

OTHER PUBLICATIONS

International Search Report and Written Opinion—PCT/US2023/072926—ISA/EPO—Dec. 13, 2023.

* cited by examiner

*Primary Examiner* — Joel Ajayi
(74) *Attorney, Agent, or Firm* — Harrity & Harrity, LLP

(57) ABSTRACT

Various aspects of the present disclosure generally relate to wireless communication. In some aspects, a network node may receive a paging message. The network node may transmit a paging repetition request for a parent network node to transmit repetitions of the paging message when transmitting paging to the network node. The network node may forward the paging message on one or more beams of the network node. Numerous other aspects are described.

30 Claims, 11 Drawing Sheets

400
Network Node
405A
405B
405C
405D
410
Receive a paging message
415
Transmit a RACH reply
Mobile Station

900

PAGING MESSAGES FOR FORWARDING BY A NETWORK NODE

FIELD OF THE DISCLOSURE

Aspects of the present disclosure generally relate to wireless communication and to techniques and apparatuses for paging messages for forwarding by a network node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving a paging message. The method may include transmitting a paging repetition request for a parent network node to transmit repetitions of the paging message when transmitting paging to the network node. The method may include forwarding the paging message on one or more beams of the network node.

Some aspects described herein relate to a method of wireless communication performed by a parent network node. The method may include transmitting a paging message to a network node. The method may include receiving a paging repetition request for a parent network node to transmit repetitions of the paging message when transmitting a paging to the network node.

Some aspects described herein relate to a network node for wireless communication. The network node may include a memory and one or more processors coupled to the memory. The one or more processors may be configured to receive a paging message. The one or more processors may be configured to transmit a paging repetition request for a parent network node to transmit repetitions of the paging message when transmitting paging to the network node. The one or more processors may be configured to forward the paging message on one or more beams of the network node.

Some aspects described herein relate to a parent network node for wireless communication. The parent network node may include a memory and one or more processors coupled to the memory. The one or more processors may be configured to transmit a paging message to a network node. The one or more processors may be configured to receive a paging repetition request for a parent network node to transmit repetitions of the paging message when transmitting a paging to the network node.

Some aspects described herein relate to a non-transitory computer-readable medium that stores a set of instructions for wireless communication by a network node. The set of instructions, when executed by one or more processors of the network node, may cause the network node to receive a paging message. The set of instructions, when executed by one or more processors of the network node, may cause the network node to transmit a paging repetition request for a parent network node to transmit repetitions of the paging message when transmitting paging to the network node. The set of instructions, when executed by one or more processors of the network node, may cause the network node to forward the paging message on one or more beams of the network node.

Some aspects described herein relate to a non-transitory computer-readable medium that stores a set of instructions for wireless communication by a parent network node. The set of instructions, when executed by one or more processors of the parent network node, may cause the parent network node to transmit a paging message to a network node. The set of instructions, when executed by one or more processors of the parent network node, may cause the parent network node to receive a paging repetition request for a parent network node to transmit repetitions of the paging message when transmitting a paging to the network node.

Some aspects described herein relate to an apparatus for wireless communication. The apparatus may include means for receiving a paging message. The apparatus may include means for transmitting a paging repetition request for a parent network node to transmit repetitions of the paging message when transmitting paging to the network node. The apparatus may include means for forwarding the paging message on one or more beams of the network node.

Some aspects described herein relate to an apparatus for wireless communication. The apparatus may include means for transmitting a paging message to a network node. The apparatus may include means for receiving a paging repetition request for a parent network node to transmit repetitions of the paging message when transmitting a paging to the network node.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
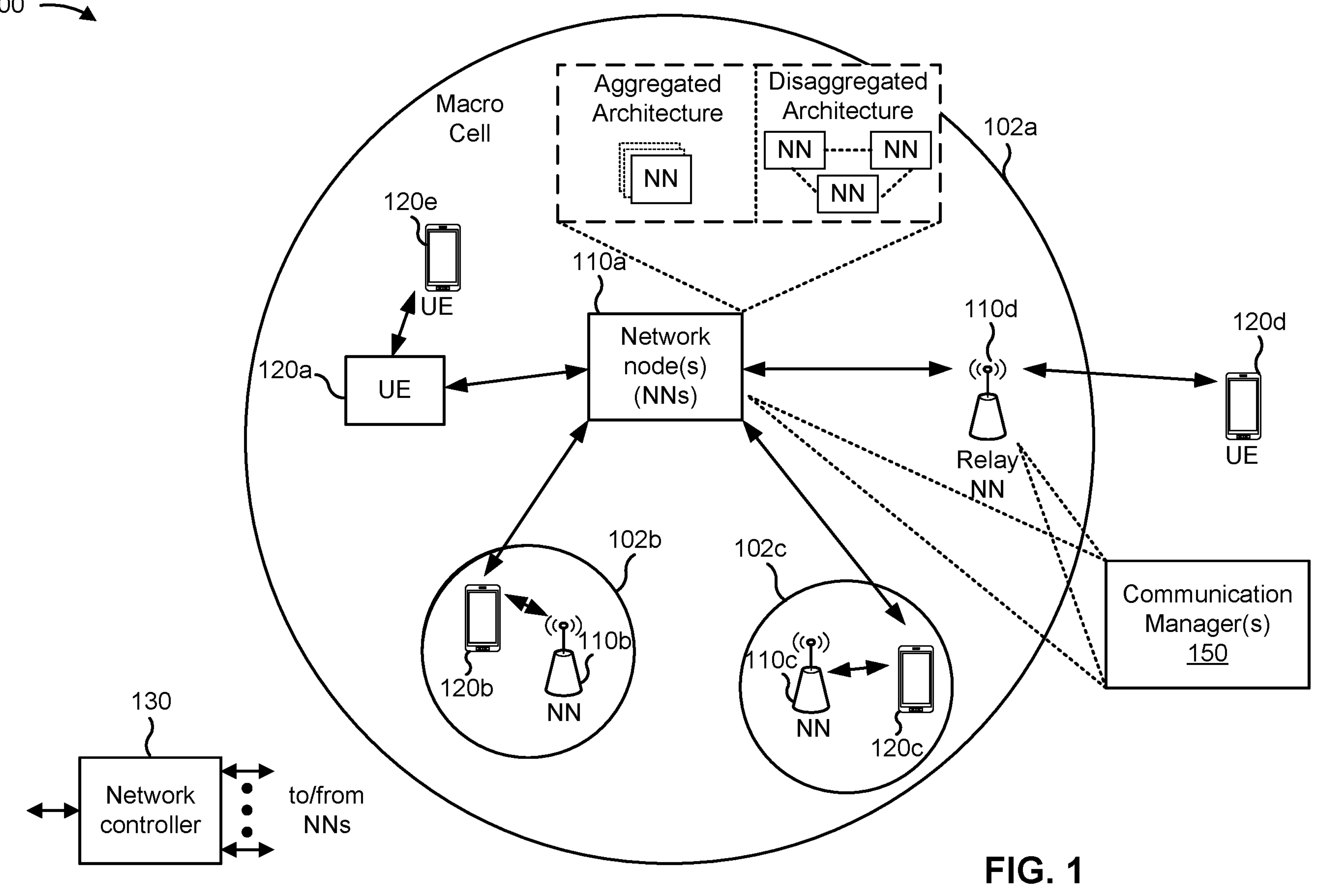
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 (e.g., forwarding node) may include a communication manager 150. As described in more detail elsewhere herein, the communication manager 150 may receive a paging message; transmit a paging repetition request for a parent network node to transmit repetitions of the paging message when transmitting paging to the network node; and forward the paging message on one or more beams of the network node. Additionally, or alternatively, the communication manager 150 may perform one or more other operations described herein.

In some aspects, a parent network node 110 may include a communication manager 150. As described in more detail elsewhere herein, the communication manager 150 may transmit a paging message to a network node; and receive a paging repetition request for a parent network node to transmit repetitions of the paging message when transmitting a paging to the network node. Additionally, or alternatively, the communication manager 150 may perform one or more other operations described herein.

As indicated above, FIG. 1 is provided as an example. Other examples may differ from what is described with regard to FIG. 1.

Figure 2:
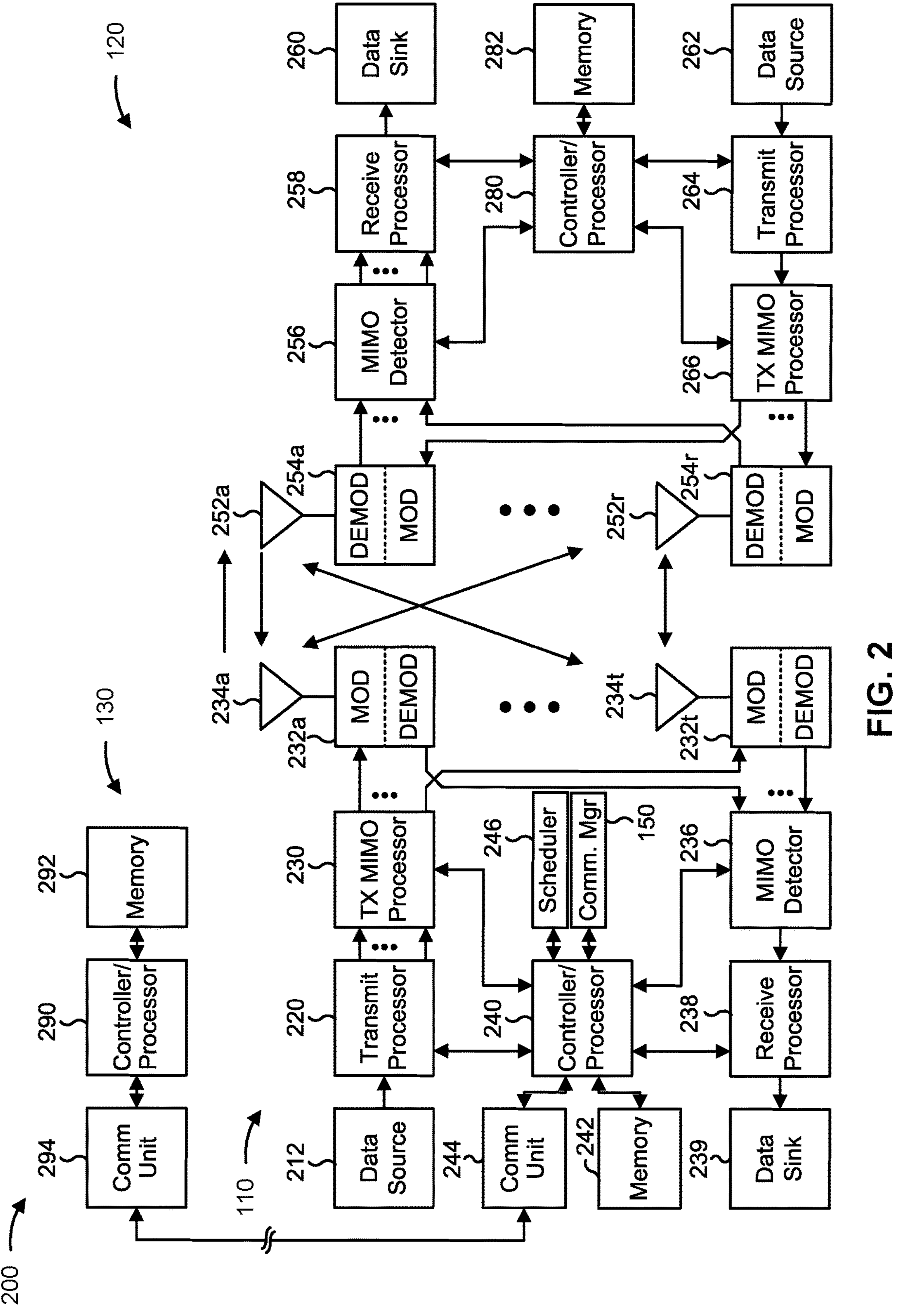
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., Tmodems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the ULE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with paging messages for forwarding by a network node, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the network node includes means for receiving a paging message; means for transmitting a paging repetition request for a parent network node to transmit repetitions of the paging message when transmitting paging to the network node; and/or means for forwarding the paging message on one or more beams of the network node. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the parent network node includes means for transmitting a paging message to a network node; and/or means for receiving a paging repetition request for a parent network node to transmit repetitions of the paging message when transmitting a paging to the network node. The means for the parent network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
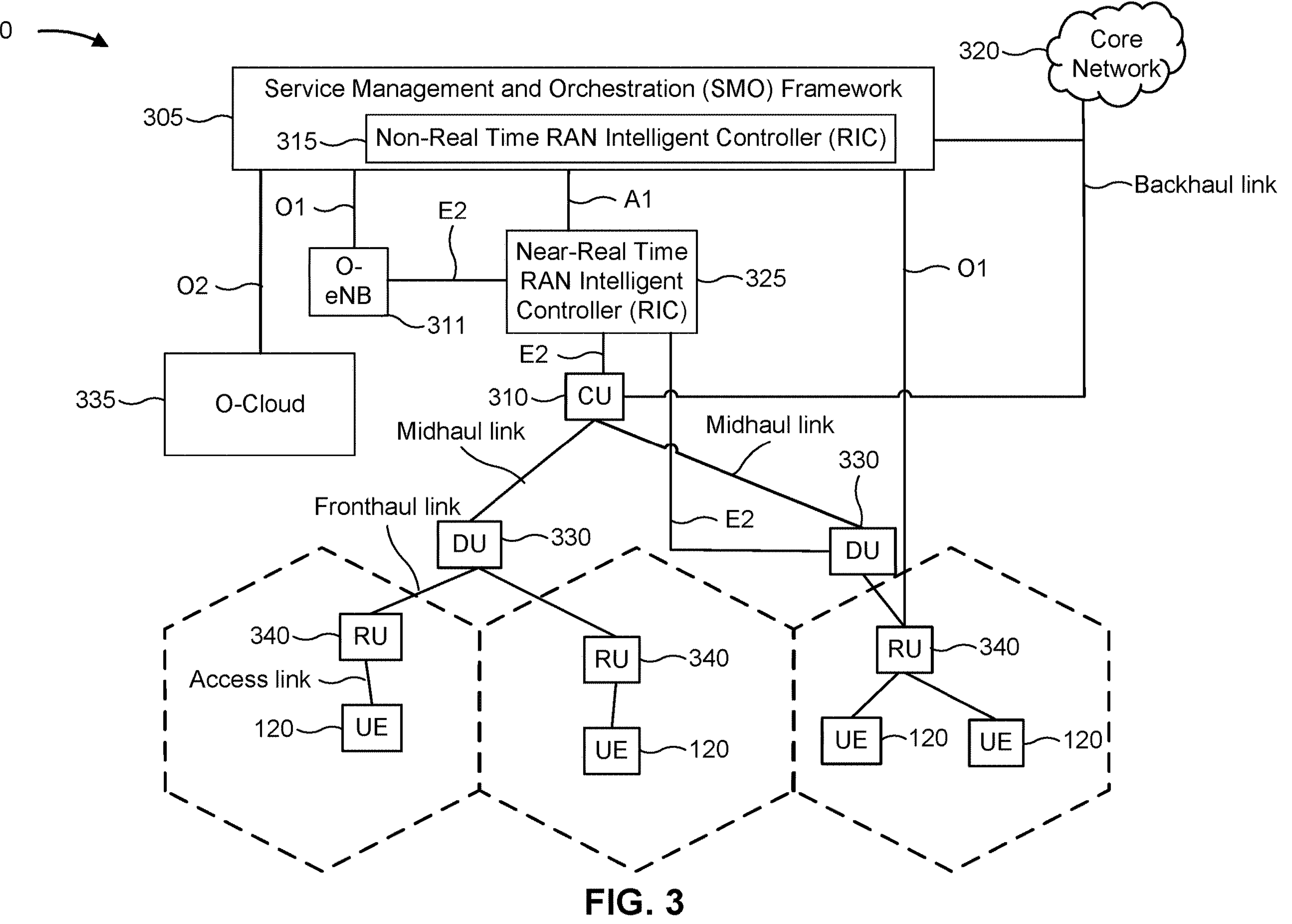
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface).

For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
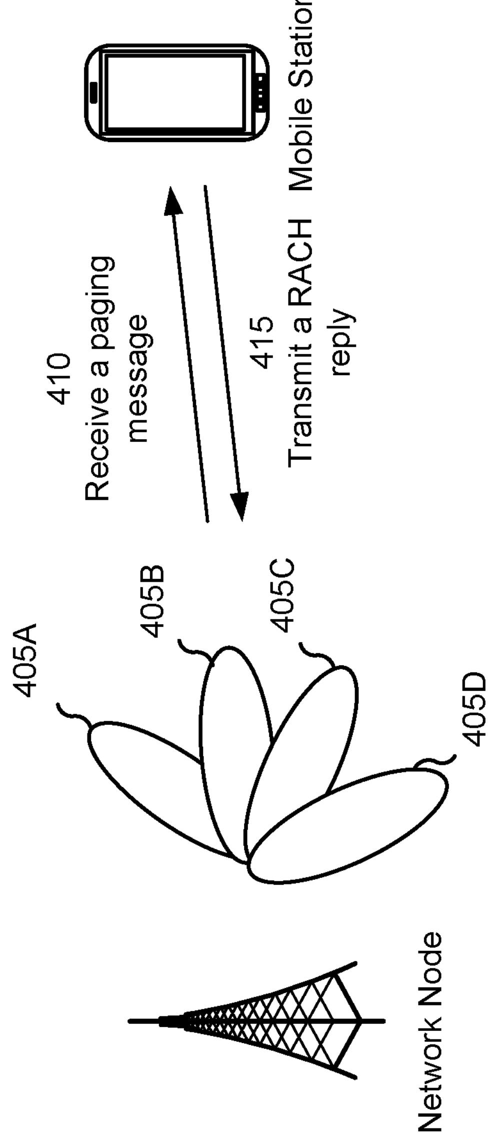
FIG. 4 is a diagram illustrating an example of a paging message process, in accordance with the present disclosure.
Figure 4:

FIG. 4 is a diagram illustrating an example 400 of a paging message process, in accordance with the present disclosure. As shown in FIG. 4, a network node may transmit a paging message to a mobile station (e.g., UE 120). The network node may transmit the paging message based at least in part on the mobile station being in an idle (e.g., RRC idle) mode or an inactive (e.g., RRC inactive) mode, among other examples. For example, the network node may have previously indicated that the mobile station is to be in an idle or inactive mode based at least in part on an amount of data communicated between the network node and the mobile station satisfying a threshold.

Based at least in part on being in an idle or inactive mode, the mobile station may conserve power resources based at least in part on having a reduced amount of resources for communication with the network node. For example, the mobile station may not have uplink resources scheduled for communication with the network node and may have periodic downlink resources to monitor for a paging message. The paging message may indicate for the mobile station to wake up and transmit a random access channel (RACH) reply to change to a connected mode for reception of a communication from the network node.

The network node may operate a number of beams on which the network node transmits a paging message. For example, the network node may transmit the paging message on a set of beams 405A, 405B, 405C, and 405D. In some networks, the network node may transmit the paging message on all operating beams, a subset of the operating beams, or a single beam, among other examples. For example, the network node may transmit the paging message on one beam or on multiple beams based at least in part on knowledge of a location of the mobile station. The paging message may include one or more mobile stations that are to wake up for communication with the network node (e.g., to enter a connected mode).

As shown by reference number 410, the mobile station may receive, and the network node may transmit, a paging message via the beam 405B. In some networks, the paging message may indicate that the mobile station is to wake up.

The mobile station may decode a physical downlink shared channel (PDSCH) or other type of information to look for an identifier associated with the mobile station. For example, the mobile station may look for an inactive radio network temporary identifier (I-RNTI) or a 5G S-temporary mobile subscriber identity (5G-S-TMSI) associated with the mobile station.

As shown by reference number 415, the mobile station may transmit a RACH reply (e.g., to initiate a RACH procedure) based at least in part on receiving the paging message. For example, the mobile station may transmit the RACH reply based at least in part on finding an identifier associated with the mobile station within the paging message.

Based at least in part on transmitting the RACH reply, the mobile station may transition to a connected mode. In the connected mode, the mobile station may receive a communication for which the network node transmitted the paging message.

As indicated above, FIG. 4 is provided as an example. Other examples may differ from what is described with regard to FIG. 4.

Figure 5:
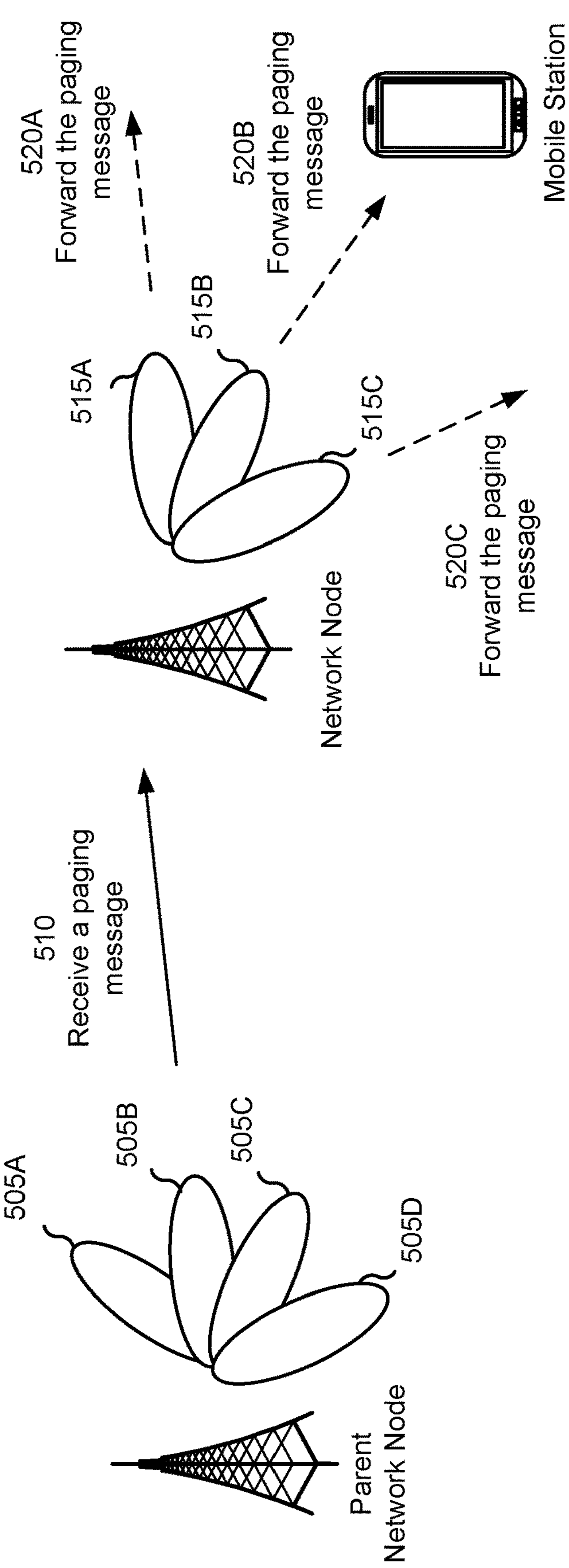
FIG. 5 is a diagram illustrating an example of a paging message process, in accordance with the present disclosure.

FIG. 5 is a diagram illustrating an example 500 of a paging message process, in accordance with the present disclosure. As shown in FIG. 5, a parent network node may attempt to transmit a paging message to a mobile station (e.g., UE 120) via a network node (e.g., a relay, a repeater, and/or a forwarding node, among other examples). The parent network node may transmit the paging message based at least in part on the mobile station being in an idle (e.g., RRC idle) mode or an inactive (e.g., RRC inactive) mode, among other examples. For example, the parent network node may have previously indicated that the mobile station is to be in an idle or inactive mode based at least in part on an amount of data communicated between the network node and the mobile station satisfying a threshold.

The parent network node may operate a number of beams on which the parent network node transmits a paging message. For example, the parent network node may transmit the paging message on a set of beams 505A, 505B, 505C, and 505D. In some networks, the network node may transmit the paging message on all operating beams, a subset of the operating beams, or a single beam, among other examples. For example, the parent network node may transmit the paging message on one beam or on multiple beams based at least in part on knowledge of a location of the mobile station. The paging message may include one or more mobile stations that are to wake up for communication with the parent network node (e.g., to enter a connected mode).

As shown by reference number 510, the network node may receive the paging message from the parent network node. The network node may determine whether the paging message identifies a mobile station in coverage of the network node before attempting to forward the paging message or may simply forward the paging message based at least in part on receiving the paging message from the parent network node.

The network node may operate a number of beams on which the network node transmits a paging message. For example, the network node may support, operate, and/or communicate with mobile stations via a set of beams 515A, 515B, and 515C. However, the network node may not know which beam to use to forward the paging message to the mobile station. For example, the mobile station may be in an idle or inactive mode in which the mobile station does not provide uplink communications to the network node (e.g., to the parent network node via the network node), so the network node does not know which beam will reach the mobile station.

Based at least in part on having only one paging message to forward, the network node may select a beam from the set of beams 515A, 515B, and 515C to try to reach the mobile station with the paging message. As shown by reference number 520A, the network node may attempt to reach the mobile station by forwarding the paging message on beam 515A. As shown by reference number 520B, the network node may attempt to reach the mobile station by forwarding the paging message on beam 515B. As shown by reference number 520C, the network node may attempt to reach the mobile station by forwarding the paging message on beam 515C. In this example, the network node may have a ⅓ chance of reaching the mobile station and having the mobile station initiate a RACH procedure to connect with the parent network node to receive a communication for which the parent network node transmitted the paging message.

Based at least in part on the network node having a relatively low probability of correctly selecting a beam for forwarding the paging message, the communication associated with the paging message may fail (e.g., based at least in part on failing a latency requirement) and/or the parent network node and/or the network node may consume network and power resources to repeat a paging operation until successfully reaching the mobile station.

As indicated above, FIG. 5 is provided as an example. Other examples may differ from what is described with regard to FIG. 5.

In some aspects described herein, a network node (e.g., forwarding node, a relay, and/or a repeater) may transmit a paging repetition request to a parent node. The paging repetition request may indicate that a single paging message may be insufficient for the network node (e.g., a network node that is transparent to mobile stations) to forward on all beams (e.g., downlink transmission beams) of the network node.

Based at least in part on the parent network node (e.g., a gNB, a CU, a DU, or an RU) receiving the paging repetition request, the parent network node may comply with the paging repetition request and direct multiple paging signals (e.g., repetitions of the paging message) towards the network node. The network node may then forward the multiple paging signals via multiple beams of the network node.

Based at least in part on the network node receiving the repetitions of the paging message for forwarding on multiple transmission beams, the network node has an improved likelihood of reaching the mobile station with the paging message. Based at least in part on reaching the mobile station with the paging message, a communication associated with the paging message may succeed (e.g., based at least in part on satisfying a latency requirement and finding the mobile station being paged) and/or the parent network node and/or the network node may conserve network and power resources that may have otherwise been used to repeat a paging operation until successfully reaching the mobile station.

Additionally, or alternatively, the parent network node may increase a timer for paging failure based at least in part on receiving the paging repetition request. For example, based at least in part on receiving the paging repetition request, the parent network node may allow for an additional paging frame, for example, to receive a reply from a paged mobile station based at least in part on a delay between transmitting the paging message and transmitting the repetitions of the paging message. Based at least in part on increasing the timer for paging failure, the network node and the parent network node may conserve network resources that may have otherwise been used to provide the paging message to additional parent network nodes (e.g., a gNB group and/or a tracking area, among other examples) for transmission of the paging message in an increased coverage area.

In some aspects, a parent network node may transmit a paging message on multiple beams (e.g., one paging occasion and/or one paging message per beam). The network node receives the paging message on one of the multiple beams and forwards the paging message on one of the beams of the network node (e.g., a downlink transmission beam of the network node). If the network node reaches the associated mobile station via the one beam of the network node, the mobile station may transmit a RACH reply to the parent network node via the network node (e.g., the forwarding node) at a next available RACH occasion.

In some aspects, the network node may decode the paging message (e.g., before or after forwarding via the one beam). Based at least in part on detecting that the paging message is a paging message (e.g., identifying characteristics of a paging message within a received signal), the network node may transmit, to the parent network node, a paging repetition request. Additionally, or alternatively, based at least in part on detecting that the paging message is paging a mobile station expected to be within coverage of the network node, the network node may transmit, to the parent network node, the paging repetition request. For example, the network node may decode the paging message to identify a list of mobile stations being paged. The network node may then transmit the paging repetition request if (e.g., only if) at least one of the mobile stations being paged is expected to be within coverage of the network node. A mobile station may be expected to be within coverage of the network node based at least in part on the network node receiving a communication from the mobile station within a recent period of time and/or based at least in part on the network node forwarding an indication to the mobile station for the mobile station to enter an idle or inactive mode.

The paging repetition request may indicate that multiple paging occasions (e.g., repetitions of the paging message) are requested to be transmitted to the network node at a subsequent paging frame. The network node may transmit the paging repetition request via uplink control information (UCI) and/or a medium access control (MAC) control element (CE) based at least in part on receiving the paging message. The network node may transmit the paging repetition request via RRC signaling based at least in part on providing the paging repetition request in an initial configuration or an update to the initial configuration with the parent network node (e.g., before receiving the paging message). In some aspects, the parent network node may allocate resources (e.g., an uplink grant) for the network node to transmit the paging repetition request. For example, a control channel (e.g., physical downlink control channel (PDCCH)) that carries the paging message may indicate the allocation of resources for the network node to provide the paging repetition request to the parent network node.

In some aspects, the network node may ignore the paging repetition request based at least in part on receiving the RACH reply from the mobile station (e.g., if the network node forwarded the original paging message on a beam having coverage that reaches the mobile station). The network node may ignore the paging repetition request by refraining from transmitting the repetitions of the paging message on a subsequent paging frame.

In some aspects, the paging repetition request may indicate a number of paging occasions (e.g., repetitions of the paging message) requested. For example, the paging repetition request may indicate a number of paging occasions equal to, or one less than, a number of active beams operated by the network node (e.g., N_repeater_beams−1 since one beam was already used when forwarding an original paging message).

In some aspects, the paging repetition request may indicate a requested time between repetitions and/or paging occasions to allow for the network node to switch between beams. An indication of the requested time may include an explicit indication of the requested time, a capability of the network node associated with beam switching, and/or a time required for beam switching by the network node, among other examples.

In some aspects, the paging repetition request may indicate a request to refrain from multiplexing the repetitions of the paging message with communications for other mobile stations within coverage of the network node. For example, this may be based at least in part on the network node not supporting simultaneous transmission on multiple beams (e.g., multiple downlink transmission beams).

In some aspects, the network node may register with the parent network node. In this way, the parent network node may be aware that transmissions in a direction of the network node may be forwarded to mobile stations. Based at least in part on registering the network node with the parent network node, the network node may not need to transmit the paging repetition request after each paging message. For example, the network node may transmit the paging repetition request with registration information. In this way, the parent network node may transmit a number of repetitions of the paging message without first transmitting a single paging message and waiting to receive the paging repetition request for the paging message. In this way, latency of the paging procedure may be improved.

In some aspects, the registration may be renewed and/or updated (e.g., based at least in part on a changed configuration and/or setting of the network node, such as a number of active transmission beams, among other examples). In some aspects, the network node may transmit the paging repetition request (e.g., a renewal and/or update to the registration) after receiving any paging message, after a paging message that is a configured amount of time after a most recent paging repetition request (e.g., N radio frames from the most recent paging repetition request), only by request from the parent network node (e.g., as part of a network-wide refresh advertised by a system information block (SIB), among other examples).

Figure 6:
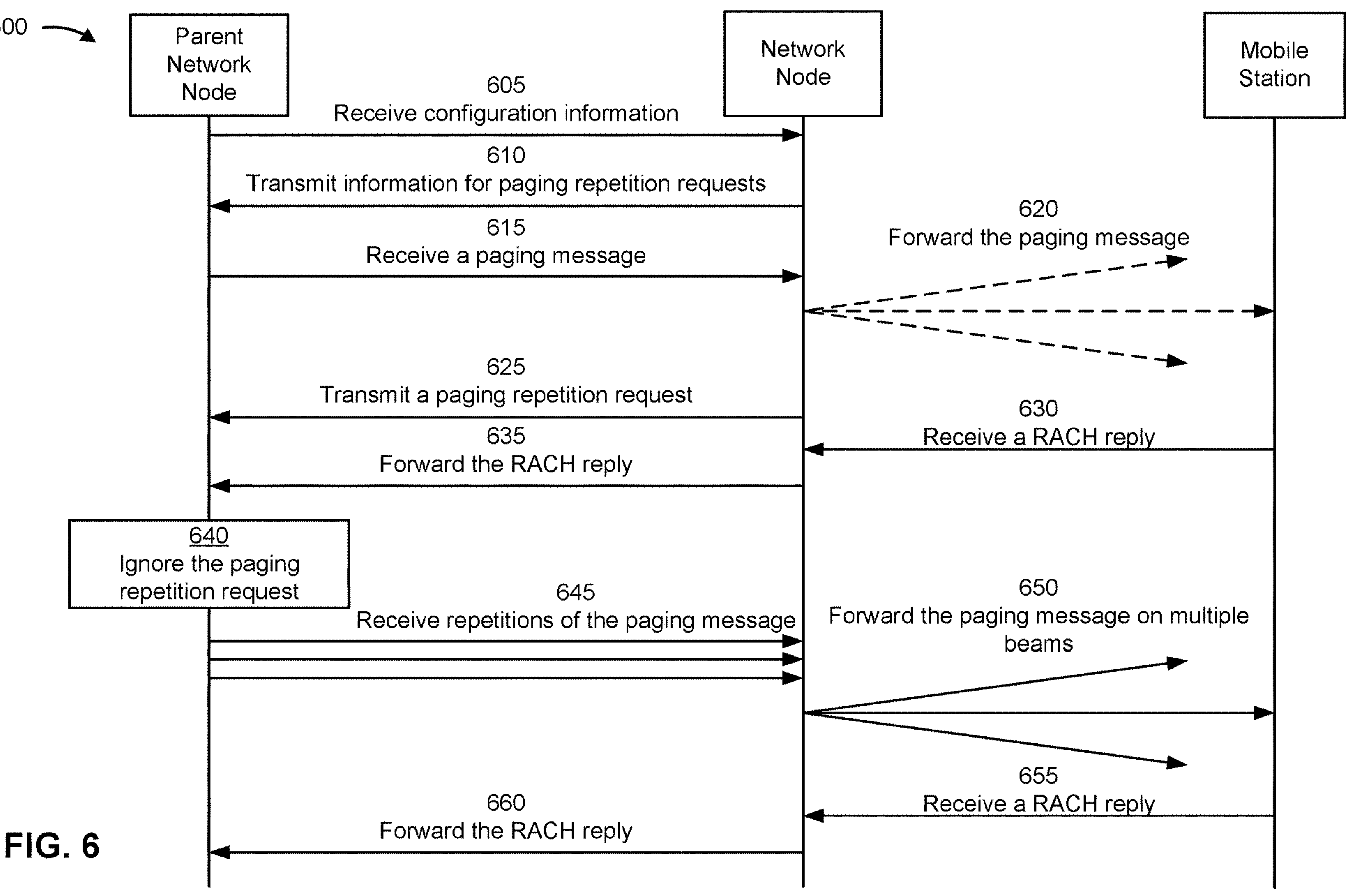
FIG. 6 is a diagram of an example associated with mapping of time and frequency resources to beams of a network node, in accordance with the present disclosure.

FIG. 6 is a diagram of an example 600 associated with mapping of time and frequency resources to beams of a network node, in accordance with the present disclosure. As shown in FIG. 6, a network node (e.g., network node 110, an IAB node, a repeater, a forwarding node, a relay, a DU, and/or an RU) may communicate with a parent network node (e.g., network node 110, an IAB node, a repeater, a forwarding node, a relay, a CU, a DU, and/or an RU) and a mobile station (e.g., UE 120). In some aspects, the network node, the parent network node, and/or the mobile station may be part of a wireless network (e.g., wireless network 100). The network node, the parent network node, and/or the mobile station may have established a wireless connection prior to operations shown in FIG. 6. In some aspects, the parent network node may have transmitted an indication for the mobile station to enter into an idle or inactive mode.

As shown by reference number 605, the parent network node may transmit, and the network node may receive, configuration information. In some aspects, the network node may receive the configuration information via one or more of RRC signaling, one or more MAC CEs, and/or downlink control information (DCI), among other examples. In some aspects, the configuration information may include an indication of one or more configuration parameters (e.g., already known to the network node and/or previously indicated by the parent network node or other network device) for selection by the network node, and/or explicit configuration information for the network node to use to configure the network node, among other examples.

In some aspects, the configuration information may indicate that the network node is to transmit an indication of support for forwarding pages. In some aspects, the configuration information may indicate that the network node is to transmit information for paging repetition requests. In some aspects, the configuration information may indicate a type and/or amount of information to provide to the parent network node.

The network node may configure itself based at least in part on the configuration information. In some aspects, the network node may be configured to perform one or more operations described herein based at least in part on the configuration information.

As shown by reference number 610, the network node may transmit, and the parent network node may receive, information for paging repetition requests. For example, the information for paging repetition request may be a paging repetition request and/or may include one or more parameters for transmitting a subsequent paging repetition request.

As shown by reference number 615, the network node may receive a paging message. In some networks, the paging message may indicate that the mobile station is to wake up. For example, the parent network node may receive or generate data for transmission to the mobile station. However, the mobile station is not in a connected mode, so the parent network node transmits the paging mode to indicate that the mobile station is to initiate a RACH procedure.

In some aspects, the network node may decode the paging message. For example, the network node may decode the paging message to identify the paging message as a paging message. Additionally, or alternatively, the network node may decode the paging message to identify UEs being paged with the paging message. The network node may determine if any of the UEs being paged with the paging message are expected to be within coverage of the network node.

In some aspects, the paging message may include an allocation of resources for transmission of a paging repetition request.

As shown by reference number 620, the network node may forward the paging message. In some aspects, the network node may forward the paging message on one or more beams of the network node. For example, the network node may attempt to forward the paging message via one beam of the network node. As shown in FIG. 6, the paging message may not reach the mobile station based at least in part on the network node forwarding the paging message using a different beam than a beam that is directed at the mobile station.

As shown by reference number 625, the network node may transmit, and the parent network node may receive, a paging repetition request. For example, the network node may transmit the paging repetition request based at least in part on receiving the paging message before transmitting the paging repetition request (e.g., for each received paging message). Alternatively, the network node may transmit the paging repetition request periodically, based at least in part on receiving a paging message only after an amount of time has passed since a most-recent paging repetition request (e.g., only after a timer has expired to allow for refreshing the paging repetition request), or based at least in part on a request from the parent network node, among other examples. In some aspects, the network node may transmit the paging repetition request before receiving the paging message (e.g., in a periodic transmission and/or during a configuration and/or an update to a configuration, such as with the information for paging repetition requests described in connection with reference number 610). In some examples, the paging repetition request may apply to multiple paging messages (e.g., to a configured and/or indicated number) for a period of time, and/or until transmission of an update, among other examples.

In some aspects, the network node may transmit the paging repetition request based at least in part on decoding the paging message. For example, the network node may transmit the paging repetition request based at least in part on identifying the paging message as a paging message. Additionally, or alternatively, the network node may transmit the paging repetition request based at least in part on identifying mobile stations being paged with the paging message to include a mobile station that is expected to be within coverage of the network node. For example, the paging message may indicate a page to a mobile station within coverage of the network node.

In some aspects, the paging repetition request may indicate a request for the parent network node to transmit repetitions (e.g., paging occasions) of the paging message when transmitting paging to the network node. The paging repetition request may indicate a number of beams that the network node operates and/or a number of repetitions needed for the network node to forward the paging network on the network node beams (e.g., all of the network node beams), among other examples. Additionally, or alternatively, the paging repetition request may indicate a requested time gap between the paging occasions or repetitions and/or a capability for beam switching, among other examples.

In some aspects, the network node may transmit the paging repetition request using resources allocated via the paging message and/or configured in another message. In some aspects, the network node may transmit the paging repetition request before forwarding the paging message, as described in connection with reference number 620.

In some aspects, the paging repetition request may indicate one or more mobile stations for which the network node does not support multiplexing with the paging message. For example, the paging repetition request may indicate a request to refrain from multiplexing communications with any mobile stations within coverage of the network node during resources used for forwarding the paging message. The network node may indicate the mobile stations within coverage of the network node based at least in part on identifiers of the mobile stations within coverage and/or based at least in part on a transmission beam of the parent network node used to communicate via the network node.

In some aspects, the parent network node may adjust a timer for paging failure based at least in part on receiving the paging repetition request. For example, the parent network node may increase the timer (e.g., a duration of the timer) based at least in part on receiving the paging repetition request. In this way, the parent network node may increase an amount of time allowed before reporting up a network hierarchy that the paging failed. This may prevent an escalation that may include multiple parent network nodes (e.g., RUs, CUs, and/or DUs) transmitting the paging message to increase a coverage area in an attempt to reach the mobile station.

As shown by reference number 630, the network node may receive, and the mobile station may transmit, a RACH reply. For example, the network node may receive the RACH reply based at least in part on selecting a correct beam to use for forwarding the paging message.

As shown by reference number 635, the network node may forward the RACH reply to the parent network node. In some aspects, the network node may forward the RACH reply after transmitting the paging repetition request. In some aspects, the network node may transmit the paging repetition request before receiving the RACH reply.

As shown by reference number 640, the network node may ignore the paging repetition request. In some aspects, the network node may ignore the paging repetition request based at least in part on receiving the RACH reply. For example, ignoring the paging request may include refraining from transmitting repetitions of the paging request after receiving the RACH reply.

As shown by reference number 645, the network node may receive, and the parent network node may transmit, repetitions of the paging message (e.g., within a single paging frame). For example, the parent network node may transmit the repetitions of the paging message based at least in part on failing to receive the RACH reply (e.g., based at least in part on the network node selecting an incorrect beam for forwarding the paging message) and/or based at least in part on receiving the paging repetition request.

In some aspects, the repetitions of the paging message may include a number of repetitions requested by the network node, a number that is equal to a number of beams operated by the network node, or a number that is one less than the number of beams operated by the network node (e.g., based at least in part on the network node already forwarding the paging request on a beam before transmitting the paging repetition request), among other examples.

In some aspects, the network node may receive the paging message during a paging frame that is after the paging message (e.g., a paging frame that includes the paging message) described in connection with reference number 615.

In some aspects, the parent network node may transmit the repetitions of the paging message without first transmitting the paging message described in connection with reference number 615. For example, the parent network node may receive the information for paging repetition requests (e.g., a paging request, itself), with an indication of a number of beams that the network node operates and/or a number of repetitions needed for the network node to forward the paging network on the network node beams (e.g., all of the network node beams), among other examples. In this example, the repetitions of the paging message may be referred to as the paging message.

As shown by reference number 650, the network node may forward the paging message (e.g., with repetitions) on multiple beams. In some aspects, the network node may forward the paging message on all beams (e.g., all transmission beams and/or all downlink beams) operated by the network node. In some aspects, the network node may forward the paging message on all but one beam (e.g., excluding a beam already used to forward the paging message described in connection with reference number 620) operated by the network node. In some aspects, the network node may forward the paging message on the one or more beams of the network node during the subsequent paging frame (e.g., a frame that is subsequent to a frame that included forwarding the paging message described in connection with reference number 620 and/or that included receiving the paging message described in connection with reference number 615).

As shown by reference number 655, the network node may receive, and the mobile station may transmit, a RACH reply. For example, the network node may receive the RACH reply based at least in part on the mobile station being reached via a beam of the network node. In some aspects, the RACH reply may initiate a RACH procedure. In some aspects, the RACH reply may include a MSG1 or a MSGA of a RACH procedure.

As shown by reference number 660, the network node may forward, and the parent network node may receive, the RACH reply.

Based at least in part on the network node receiving the repetitions of the paging message for forwarding on multiple transmission beams, the network node has an improved likelihood of reaching the mobile station with the paging message. Based at least in part on reaching the mobile station with the paging message, a communication associated with the paging message may succeed (e.g., based at least in part on satisfying a latency requirement) and/or the parent network node and/or the network node may conserve network and power resources that may have otherwise been used to repeat a paging operation until successfully reaching the mobile station.

As indicated above, FIG. 6 is provided as an example. Other examples may differ from what is described with regard to FIG. 6.

Figure 7:
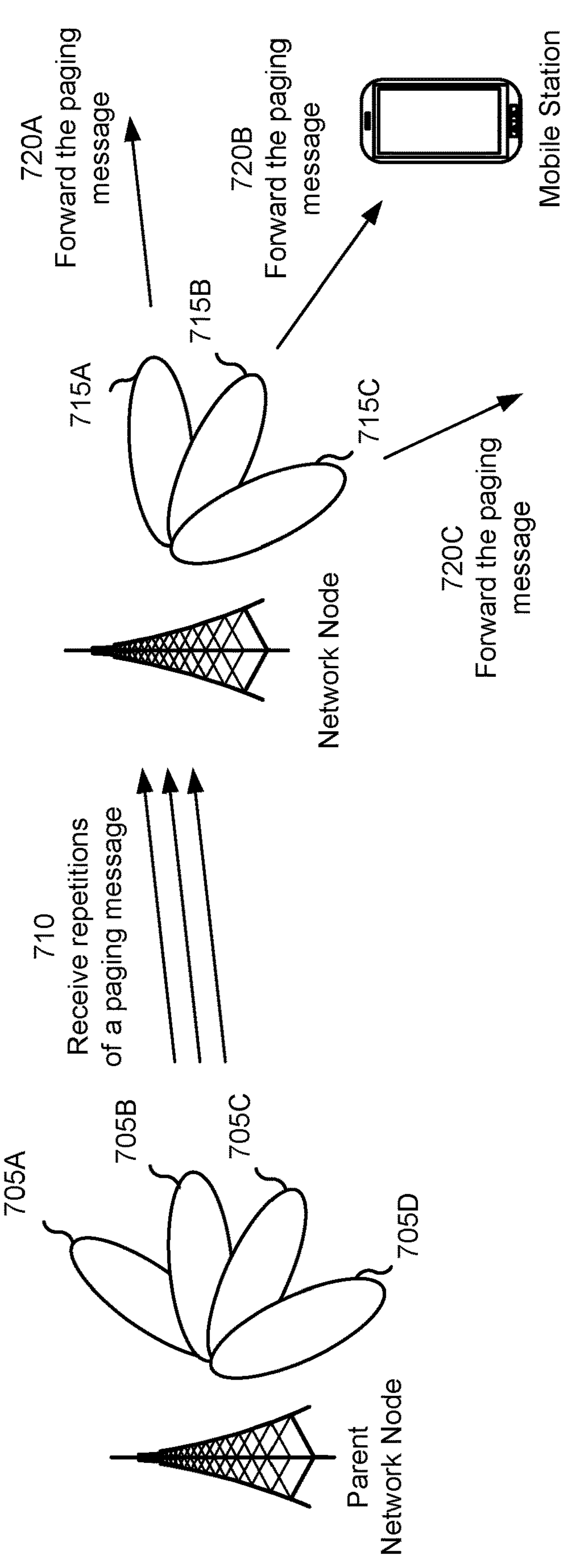
FIG. 7 is a diagram illustrating an example of a paging message process, in accordance with the present disclosure.

FIG. 7 is a diagram illustrating an example 700 of a paging message process, in accordance with the present disclosure. As shown in FIG. 7, a parent network node (e.g., a parent network node) may attempt to transmit a paging message to a mobile station (e.g., UE 120) via a network node (e.g., a relay, a repeater, and/or a forwarding node, among other examples). The parent network node may transmit the paging message based at least in part on the mobile station being in an idle (e.g., RRC idle) mode or an inactive (e.g., RRC inactive) mode, among other examples. For example, the parent network node may have previously indicated that the mobile station is to be in an idle or inactive mode based at least in part on an amount of data communicated between the network node and the mobile station satisfying a threshold.

The parent network node may operate a number of beams on which the parent network node transmits a paging message. For example, the parent network node may transmit the paging message on a set of beams 705A, 705B, 705C, and 705D. In some networks, the network node may transmit the paging message on all operating beams, a subset of the operating beams, or a single beam, among other examples. For example, the parent network node may transmit the paging message on one beam or on multiple beams based at least in part on knowledge of a location of the mobile station. The paging message may include one or more mobile stations that are to wake up for communication with the parent network node (e.g., to enter a connected mode).

As shown by reference number 710, the network node may receive repetitions of the paging message from the parent network node. For example, the network node may receive a number of repetitions during a number of paging occasions of a single paging frame. The network node may determine whether the paging message identifies a mobile station in coverage of the network node before attempting to forward the paging message or may simply forward the paging message based at least in part on receiving the paging message from the parent network node.

The network node may operate a number of beams on which the network node transmits a paging message. For example, the network node may support, operate, and/or communicate with mobile stations via a set of beams 715A, 715B, and 715C.

However, the network node may not know which beam to use to forward the paging message to the mobile station. For example, the mobile station may be in an idle or inactive mode in which the mobile station does not provide uplink communications to the network node (e.g., to the parent network node via the network node), so the network node does not know which beam will reach the mobile station.

Based at least in part on having multiple repetitions of the paging message to forward, the network node may forward the paging message on all or a subset of active beams of the network node. For example, the network node may forward the paging message on each of the set of beams 715A, 715B, and 715C to try to reach the mobile station with the paging message. As shown by reference number 720A, the network node may attempt to reach the mobile station by forwarding the paging message on beam 715A. As shown by reference number 720B, the network node may attempt to reach the mobile station by forwarding the paging message on beam 715B. As shown by reference number 720C, the network node may attempt to reach the mobile station by forwarding the paging message on beam 715C. In this example, the network node reaches the mobile station, which may then initiate a RACH procedure to connect with the parent network node to receive a communication for which the parent network node transmitted the paging message.

Based at least in part on the network node receiving the repetitions of the paging message for forwarding on multiple transmission beams, the network node has an improved likelihood of reaching the mobile station with the paging message. Based at least in part on reaching the mobile station with the paging message, a communication associated with the paging message may succeed (e.g., based at least in part on satisfying a latency requirement) and/or the parent network node and/or the network node may conserve network and power resources that may have otherwise been used to repeat a paging operation until successfully reaching the mobile station.

As indicated above, FIG. 7 is provided as an example. Other examples may differ from what is described with regard to FIG. 7.

Figure 8:
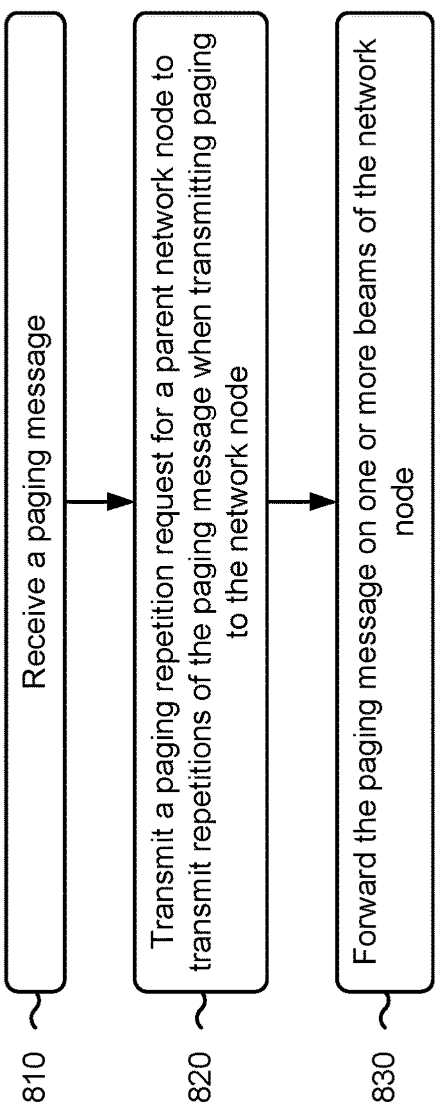
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with paging messages for forwarding by the network node.

As shown in FIG. 8, in some aspects, process 800 may include receiving a paging message (block 810). For example, the network node (e.g., using communication manager 150 and/or reception component 1002, depicted in FIG. 10) may receive a paging message, as described above.

As further shown in FIG. 8, in some aspects, process 800 may include transmitting a paging repetition request for a parent network node to transmit repetitions of the paging message when transmitting paging to the network node (block 820). For example, the network node (e.g., using communication manager 150 and/or transmission component 1004, depicted in FIG. 10) may transmit a paging repetition request for a parent network node to transmit repetitions of the paging message when transmitting paging to the network node, as described above.

As further shown in FIG. 8, in some aspects, process 800 may include forwarding the paging message on one or more beams of the network node (block 830).

Figure 10:
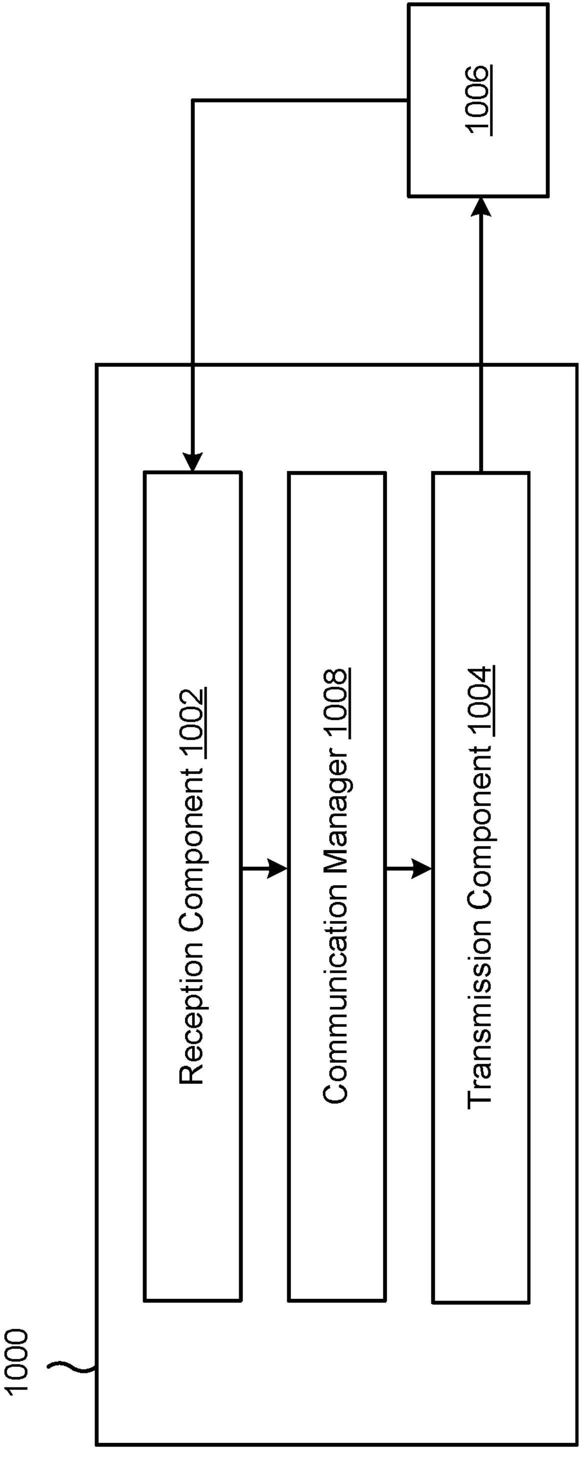
FIG. 10 is a diagram of an example apparatus for wireless communication, in accordance with the present disclosure.

For example, the network node (e.g., using communication manager 150 and/or transmission component 1004, depicted in FIG. 10) may forward the paging message on one or more beams of the network node, as described above.

Process 800 may include additional aspects, such as any single aspect or any combination of aspects described below and/or in connection with one or more other processes described elsewhere herein.

In a first aspect, the network node comprises a repeater.

In a second aspect, alone or in combination with the first aspect, transmitting the paging repetition request is based at least in part on receiving the paging message before transmitting the paging repetition request.

In a third aspect, alone or in combination with one or more of the first and second aspects, transmitting the paging repetition request is based at least in part on the paging message indicating a page to a mobile station within coverage of the network node.

In a fourth aspect, alone or in combination with one or more of the first through third aspects, process 800 includes receiving the paging message with repetitions during a paging frame that is after the paging message, wherein forwarding the paging message on the one or more beams of the network node comprises transmitting, during the subsequent paging frame, the paging message with repetitions on multiple beams of the network node.

In a fifth aspect, alone or in combination with one or more of the first through fourth aspects, a timer for paging failure, associated with the paging message, has a duration that is increased based at least in part on transmitting the paging repetition request.

In a sixth aspect, alone or in combination with one or more of the first through fifth aspects, receiving the paging message comprises receiving the paging message and an uplink grant that allocates resources for transmission of the paging repetition request.

In a seventh aspect, alone or in combination with one or more of the first through sixth aspects, process 800 includes receiving a RACH reply from one or more mobile stations within coverage of the network node, and forwarding the RACH reply to the parent network node.

In an eighth aspect, alone or in combination with one or more of the first through seventh aspects, the paging repetition request indicates one or more of a number of paging occasions or repetitions of the paging message that is requested for forwarding, a requested time gap between the paging occasions or repetitions, or a capability for beam switching.

In a ninth aspect, alone or in combination with one or more of the first through eighth aspects, the paging repetition request indicates one or more mobile stations for which the network node does not support multiplexing with the paging message.

In a tenth aspect, alone or in combination with one or more of the first through ninth aspects, transmitting the paging repetition request comprises transmitting the paging repetition request before receiving the paging message, transmitting the paging repetition request periodically, transmitting the paging repetition request for each received paging message, or transmitting the paging repetition request based at least in part on receiving a request for the paging repetition request.

In an eleventh aspect, alone or in combination with one or more of the first through tenth aspects, the paging repetition request applies to multiple paging messages or for a period of time.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
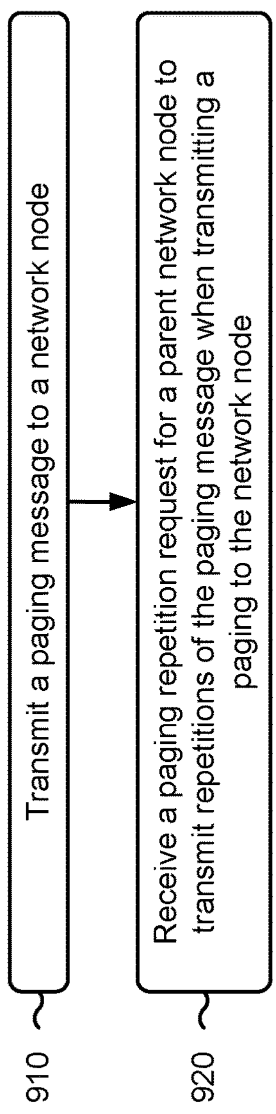
FIG. 9 is a diagram illustrating an example process performed, for example, by a parent network node, in accordance with the present disclosure.

FIG. 9 is a diagram illustrating an example process 900 performed, for example, by a parent network node, in accordance with the present disclosure. Example process 900 is an example where the parent network node (e.g., network node 110) performs operations associated with paging messages for forwarding by a network node.

As shown in FIG. 9, in some aspects, process 900 may include transmitting a paging message to a network node (block 910). For example, the parent network node (e.g., using communication manager 150 and/or transmission component 1104, depicted in FIG. 11) may transmit a paging message to a network node, as described above.

As further shown in FIG. 9, in some aspects, process 900 may include receiving a paging repetition request for a parent network node to transmit repetitions of the paging message when transmitting a paging to the network node (block 920). For example, the parent network node (e.g., using communication manager 150 and/or reception component 1102, depicted in FIG. 11) may receive a paging repetition request for a parent network node to transmit repetitions of the paging message when transmitting a paging to the network node, as described above.

Process 900 may include additional aspects, such as any single aspect or any combination of aspects described below and/or in connection with one or more other processes described elsewhere herein.

In a first aspect, the network node comprises a repeater.

In a second aspect, alone or in combination with the first aspect, receiving the paging repetition request is based at least in part on transmitting the paging message before receiving the paging repetition request.

In a third aspect, alone or in combination with one or more of the first and second aspects, receiving the paging repetition request is based at least in part on the paging message indicating a page to a mobile station within coverage of the network node.

In a fourth aspect, alone or in combination with one or more of the first through third aspects, process 900 includes transmitting the paging message with repetitions during a paging frame that is after the paging message.

In a fifth aspect, alone or in combination with one or more of the first through fourth aspects, a timer for paging failure, associated with the paging message, has a duration that is increased based at least in part on receiving the paging repetition request.

In a sixth aspect, alone or in combination with one or more of the first through fifth aspects, transmitting the paging message comprises transmitting the paging message and an uplink grant that allocates resources for transmission of the paging repetition request.

In a seventh aspect, alone or in combination with one or more of the first through sixth aspects, process 900 includes receiving, via the network node, a RACH reply from one or more mobile stations within coverage of the network node.

In an eighth aspect, alone or in combination with one or more of the first through seventh aspects, the paging repetition request indicates one or more of a number of paging occasions or repetitions of the paging message that is requested for forwarding, a requested time gap between the paging occasions or repetitions, or a capability for beam switching by the network node.

In a ninth aspect, alone or in combination with one or more of the first through eighth aspects, the paging repetition request indicates one or more mobile stations for which the network node does not support multiplexing with the paging message.

In a tenth aspect, alone or in combination with one or more of the first through ninth aspects, receiving the paging repetition request comprises receiving the paging repetition request before transmitting the paging message, receiving the paging repetition request periodically, receiving the paging repetition request for each received paging message, or receiving the paging repetition request based at least in part on transmitting a request for the paging repetition request.

In an eleventh aspect, alone or in combination with one or more of the first through tenth aspects, the paging repetition request applies to multiple paging messages or for a period of time.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150).

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive a paging message. The transmission component 1004 may transmit a paging repetition request for a parent network node to transmit repetitions of the paging message when transmitting paging to the network node. The transmission component 1004 may forward the paging message on one or more beams of the network node.

The reception component 1002 may receive the paging message with repetitions during a paging frame that is after the paging message wherein forwarding the paging message on the one or more beams of the network node comprises transmitting, during the subsequent paging frame, the paging message with repetitions on multiple beams of the network node.

The reception component 1002 may receive a RACH reply from one or more mobile stations within coverage of the network node.

The transmission component 1004 may forward the RACH reply to the parent network node.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
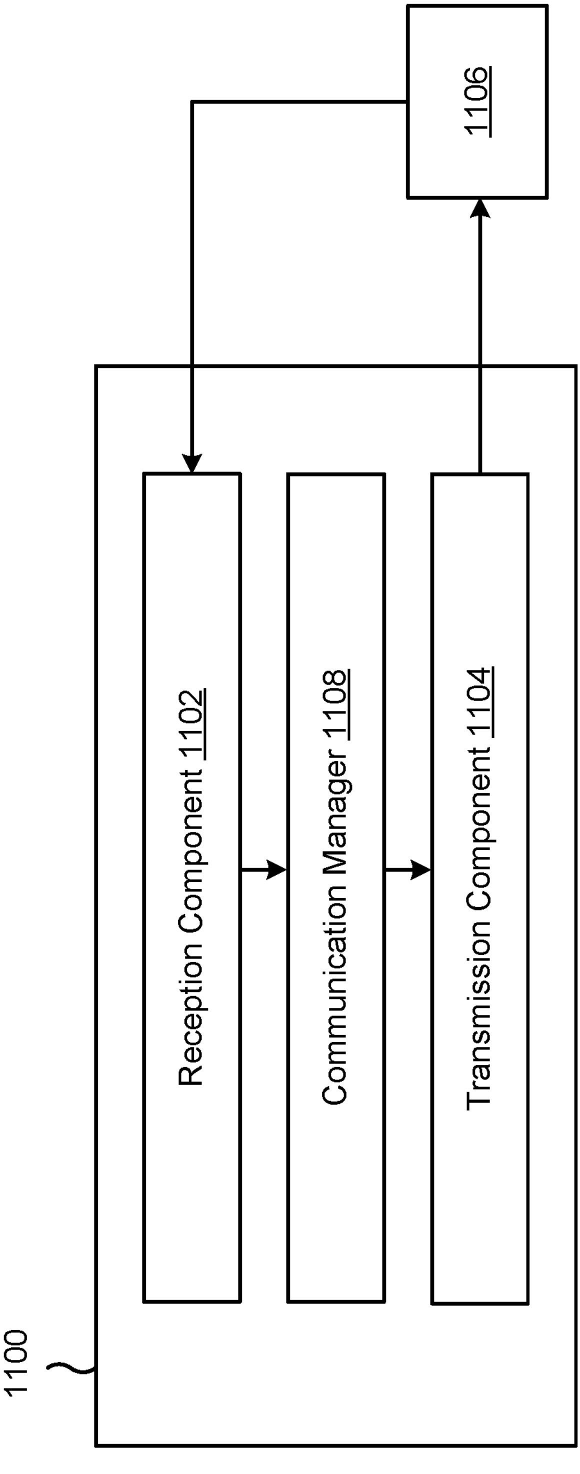
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a parent network node, or a parent network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the parent network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the parent network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the parent network node described in connection with FIG. 2. In some aspects, the transmission component 1104 may be co-located with the reception component 1102 in a transceiver.

The transmission component 1104 may transmit a paging message to a network node. The reception component 1102 may receive a paging repetition request for a parent network node to transmit repetitions of the paging message when transmitting a paging to the network node.

The transmission component 1104 may transmit the paging message with repetitions during a paging frame that is after the paging message.

The reception component 1102 may receive, via the network node, a RACH reply from one or more mobile stations within coverage of the network node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: receiving a paging message; transmitting a paging repetition request for a parent network node to transmit repetitions of the paging message when transmitting paging to the network node; and forwarding the paging message on one or more beams of the network node.

Aspect 2: The method of Aspect 1, wherein the network node comprises a repeater.

Aspect 3: The method of any of Aspects 1-2, wherein transmitting the paging repetition request is based at least in part on receiving the paging message before transmitting the paging repetition request.

Aspect 4: The method of Aspect 3, wherein transmitting the paging repetition request is based at least in part on the paging message indicating a page to a mobile station within coverage of the network node.

Aspect 5: The method of any of Aspects 3-4, further comprising: receiving the paging message with repetitions during a paging frame that is after the paging message, wherein forwarding the paging message on the one or more beams of the network node comprises transmitting, during the subsequent paging frame, the paging message with repetitions on multiple beams of the network node.

Aspect 6: The method of any of Aspects 1-5, wherein a timer for paging failure, associated with the paging message, has a duration that is increased based at least in part on transmitting the paging repetition request.

Aspect 7: The method of any of Aspects 1-6, wherein receiving the paging message comprises: receiving the paging message and an uplink grant that allocates resources for transmission of the paging repetition request.

Aspect 8: The method of any of Aspects 1-7, further comprising: receiving a random access channel (RACH) reply from one or more mobile stations within coverage of the network node; and forwarding the RACH reply to the parent network node.

Aspect 9: The method of any of Aspects 1-8, wherein the paging repetition request indicates one or more of: a number of paging occasions or repetitions of the paging message that is requested for forwarding, a requested time gap between the paging occasions or repetitions, or a capability for beam switching.

Aspect 10: The method of any of Aspects 1-9, wherein the paging repetition request indicates one or more mobile stations for which the network node does not support multiplexing with the paging message.

Aspect 11: The method of any of Aspects 1-10, wherein transmitting the paging repetition request comprises: transmitting the paging repetition request before receiving the paging message; transmitting the paging repetition request periodically, transmitting the paging repetition request for each received paging message, or transmitting the paging repetition request based at least in part on receiving a request for the paging repetition request.

Aspect 12: The method of any of Aspects 1-11, wherein the paging repetition request applies to multiple paging messages or for a period of time.

Aspect 13: A method of wireless communication performed by a parent network node, comprising: transmitting a paging message to a network node; and receiving a paging repetition request for a parent network node to transmit repetitions of the paging message when transmitting a paging to the network node.

Aspect 14: The method of Aspect 13, wherein the network node comprises a repeater.

Aspect 15: The method of any of Aspects 13-14, wherein receiving the paging repetition request is based at least in part on transmitting the paging message before receiving the paging repetition request.

Aspect 16: The method of Aspect 15, wherein receiving the paging repetition request is based at least in part on the paging message indicating a page to a mobile station within coverage of the network node.

Aspect 17: The method of any of Aspects 15-16, further comprising: transmitting the paging message with repetitions during a paging frame that is after the paging message.

Aspect 18: The method of any of Aspects 13-17, wherein a timer for paging failure, associated with the paging message, has a duration that is increased based at least in part on receiving the paging repetition request.

Aspect 19: The method of any of Aspects 13-18, wherein transmitting the paging message comprises: transmitting the paging message and an uplink grant that allocates resources for transmission of the paging repetition request.

Aspect 20: The method of any of Aspects 13-19, further comprising: receiving, via the network node, a random access channel (RACH) reply from one or more mobile stations within coverage of the network node.

Aspect 21: The method of any of Aspects 13-20, wherein the paging repetition request indicates one or more of: a number of paging occasions or repetitions of the paging message that is requested for forwarding, a requested time gap between the paging occasions or repetitions, or a capability for beam switching by the network node.

Aspect 22: The method of any of Aspects 13-21, wherein the paging repetition request indicates one or more mobile stations for which the network node does not support multiplexing with the paging message.

Aspect 23: The method of any of Aspects 13-22, wherein receiving the paging repetition request comprises: receiving the paging repetition request before transmitting the paging message; receiving the paging repetition request periodically, receiving the paging repetition request for each received paging message, or receiving the paging repetition request based at least in part on transmitting a request for the paging repetition request.

Aspect 24: The method of any of Aspects 13-23, wherein the paging repetition request applies to multiple paging messages or for a period of time.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed.

Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A repeater for wireless communication, comprising:
- one or more memories; and
- one or more processors that, based at least in part on information stored in the one or more memories, are configured to:
  - receive, from a parent network node, a paging message;
  - identify a number of repetitions that is one less than a number of one or more active beams operated by the repeater;
  - generate a paging repetition request for the parent network node to transmit the number of repetitions of the paging message when transmitting paging to the repeater;
  - transmit, to the parent network node, the paging repetition request; and
  - forward the paging message on the one or more active beams of the repeater.

2. The repeater of claim 1, wherein transmitting the paging repetition request is based at least in part on receiving the paging message before transmitting the paging repetition request.

3. The repeater of claim 2, wherein transmitting the paging repetition request is based at least in part on the paging message indicating a page to a mobile station within coverage of the repeater.

4. The repeater of claim 2, wherein the one or more processors are further configured to:
- receive the paging message with the number of repetitions during a paging frame that is after the paging message,
  - wherein the one or more processors, to forward the paging message on the one or more active beams of the repeater, are configured to transmit, during the paging frame, the paging message with the number of repetitions on multiple beams of the repeater.

5. The repeater of claim 1, wherein a timer for paging failure, associated with the paging message, has a duration that is increased based at least in part on transmitting the paging repetition request.

6. The repeater of claim 1, wherein the one or more processors, to receive the paging message, are configured to:
- receive the paging message and an uplink grant that allocates resources for transmission of the paging repetition request.

7. The repeater of claim 1, wherein the one or more processors are further configured to:
- receive a random access channel (RACH) reply from one or more mobile stations within coverage of the repeater; and
- forward the RACH reply to the parent network node.

8. The repeater of claim 1, wherein the paging repetition request indicates one or more of:
- a requested time gap between the repetitions, or
- a capability for beam switching.

9. The repeater of claim 1, wherein the paging repetition request indicates one or more mobile stations for which the repeater does not support multiplexing with the paging message.

10. The repeater of claim 1, wherein the one or more processors, to transmit the paging repetition request, are configured to:
- transmit the paging repetition request before receiving the paging message;
- transmit the paging repetition request periodically;
- transmit the paging repetition request for each received paging message; or
- transmit the paging repetition request based at least in part on receiving a request for the paging repetition request.

11. The repeater of claim 1, wherein the paging repetition request applies to multiple paging messages or for a period of time.

12. A parent network node for wireless communication, comprising:
- one or more memories; and
- one or more processors that, based at least in part on information stored in the one or more memories, are configured to:
  - transmit a paging message to a repeater;
  - receive, from the repeater, a paging repetition request for a parent network node to transmit a number of repetitions of the paging message when transmitting a paging to the repeater, wherein the paging repetition request indicates the number of repetitions, and wherein the number of repetitions is one less than a number of one or more active beams operated by the repeater;
  - identify the number of repetitions based on receiving the paging repetition request; and
  - transmit, to the repeater, the number of repetitions of the paging message based at least in part on receiving the paging repetition request.

13. The parent network node of claim 12, wherein receiving the paging repetition request is based at least in part on transmitting the paging message before receiving the paging repetition request.

14. The parent network node of claim 13, wherein receiving the paging repetition request is based at least in part on the paging message indicating a page to a mobile station within coverage of the repeater.

15. The parent network node of claim 13, wherein the one or more processors are further configured to:
- transmit the paging message with the number of repetitions during a paging frame that is after the paging message.

16. The parent network node of claim 12, wherein a timer for paging failure, associated with the paging message, has a duration that is increased based at least in part on receiving the paging repetition request.

17. The parent network node of claim 12, wherein the one or more processors, to transmit the paging message, are configured to:
- transmit the paging message and an uplink grant that allocates resources for transmission of the paging repetition request.

18. The parent network node of claim 12, wherein the one or more processors are further configured to:

receive, via the repeater, a random access channel (RACH) reply from one or more mobile stations within coverage of the repeater.

19. The parent network node of claim 12, wherein the paging repetition request indicates one or more of:

a requested time gap between the repetitions, or a capability for beam switching by the repeater.

20. The parent network node of claim 12, wherein the paging repetition request indicates one or more mobile stations for which the repeater does not support multiplexing with the paging message.

21. The parent network node of claim 12, wherein the one or more processors, to receive the paging repetition request, are configured to:

receive the paging repetition request before transmitting the paging message;

receive the paging repetition request periodically;

receive the paging repetition request for each received paging message; or receive the paging repetition request based at least in part on transmitting a request for the paging repetition request.

22. The parent network node of claim 12, wherein the paging repetition request applies to multiple paging messages or for a period of time.

23. A method of wireless communication performed by a repeater, comprising:

receiving, from a parent network node, a paging message;

identifying a number of repetitions that is one less than a number of one or more active beams operated by the repeater;

generating a paging repetition request for the parent network node to transmit the number of repetitions of the paging message when transmitting paging to the repeater;

transmitting, to the parent network node, the paging repetition request; and forwarding the paging message on the one or more active beams of the repeater.

24. The method of claim 23, wherein transmitting the paging repetition request is based at least in part on receiving the paging message before transmitting the paging repetition request.

25. The method of claim 23, wherein receiving the paging message comprises:

receiving the paging message and an uplink grant that allocates resources for transmission of the paging repetition request.

26. A method of wireless communication performed by a parent network node, comprising:

transmitting a paging message to a repeater;

receiving, from the repeater, a paging repetition request for the parent network node to transmit a number of repetitions of the paging message when transmitting a paging to the repeater, wherein the paging repetition request indicates the number of repetitions, and wherein the number of repetitions is one less that a number of one or more active beams operated by the repeater;

identifying the number of repetitions based on receiving the paging repetition request; and transmitting, to the repeater, the number of repetitions of the paging message based at least in part on receiving the paging repetition request.

27. The method of claim 26, wherein receiving the paging repetition request is based at least in part on transmitting the paging message before receiving the paging repetition request.

28. The method of claim 26, wherein transmitting the paging message comprises:

transmitting the paging message and an uplink grant that allocates resources for transmission of the paging repetition request.

29. The method of claim 23, wherein a timer for paging failure, associated with the paging message, has a duration that is increased based at least in part on transmitting the paging repetition request.

30. The method of claim 23, wherein the receiving the paging message comprises:

receiving the paging message and an uplink grant that allocates resources for transmission of the paging repetition request.

* * * * *